United States Patent [19]

Kugimiya et al.

[11] Patent Number: 5,161,105

[45] Date of Patent: Nov. 3, 1992

[54] MACHINE TRANSLATION APPARATUS HAVING A PROCESS FUNCTION FOR PROPER NOUNS WITH ACRONYMS

[75] Inventors: Shuzo Kugimiya, Nara; Yoji Fukumochi, Ikoma; Ichiko Sata, Nara; Tokyuki Hirai, Yamatokoriyama; Hitoshi Suzuki, Nara, all of Japan

[73] Assignee: Sharp Corporation, Osaka, Japan

[21] Appl. No.: 544,329

[22] Filed: Jun. 27, 1990

[30] Foreign Application Priority Data

Jun. 30, 1989 [JP] Japan .................................. 1-170301

[51] Int. Cl.⁵ .............................................. G06F 15/38
[52] U.S. Cl. .................................................. 364/419
[58] Field of Search ................. 364/419, 900 MS File

[56] References Cited

U.S. PATENT DOCUMENTS

| | | | |
|---|---|---|---|
| 4,862,408 | 8/1989 | Zamora | 364/419 |
| 4,870,610 | 9/1989 | Belfer | 364/419 |
| 4,953,088 | 8/1990 | Suzuki et al. | 364/419 |

FOREIGN PATENT DOCUMENTS 63-182775 7/1988 Japan .

Primary Examiner—Dale M. Shaw
Assistant Examiner—Xuong M. Chung
Attorney, Agent, or Firm—David G. Conlin; Robert F. O'Connell

[57] ABSTRACT

A machine translation apparatus in which the sentence construction of a source language entered by an input device is analyzed in order to generate the corresponding translated text after being converted into a sentence construction in a target language, wherein the machine translation apparatus uses a device for determining whether or not a word string obtained from a sentence construction analysis is a proper noun with an acronym, a device for examining whether or not the number of first letters of each of a certain number of words corresponds to the number of letters of the acronym, and also for examining whether or nor these words are registered in a dictionary, and a device for outputting the corresponding term after it is translated into a target language, when the words are registered in the dictionary, and for outputting directly the words, whose number of first letters corresponds to the number of the letters of the acronym, without translating them, when the words are not registered in the dictionary.

5 Claims, 13 Drawing Sheets

FIG. 5

EXAMPLE SENTENCE (This is a pen.)
BUFFER A --- Source Sentence Buffer

| t | h | i | s |   |   |   |   |
|---|---|---|---|---|---|---|---|
| i | s |   |   |   |   |   |   |
| a |   |   |   |   |   |   |   |
| p | e | n |   |   |   |   |   |
|   |   |   |   |   |   |   |   |

FIG. 6

BUFFER B --- Part of Buffer as a Result of Consulting Dictionary

| | | | |
|---|---|---|---|
| this -- | PRONOUN | DEMONSTRATIVE ADJECTIVE | |
| is -- | VERB | | |
| a -- | ARTICLE | | |
| pen -- | NOUN | | |

FIG. 7
BUFFER C --- Buffer as a Result of Sentence Construction Analysis
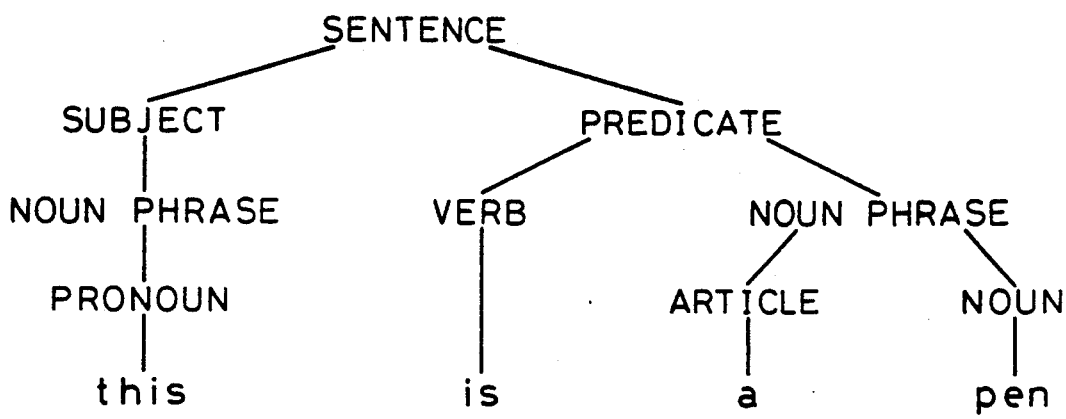
FIG. 8
BUFFER D --- Buffer as a Result of Tree Conversion Subject
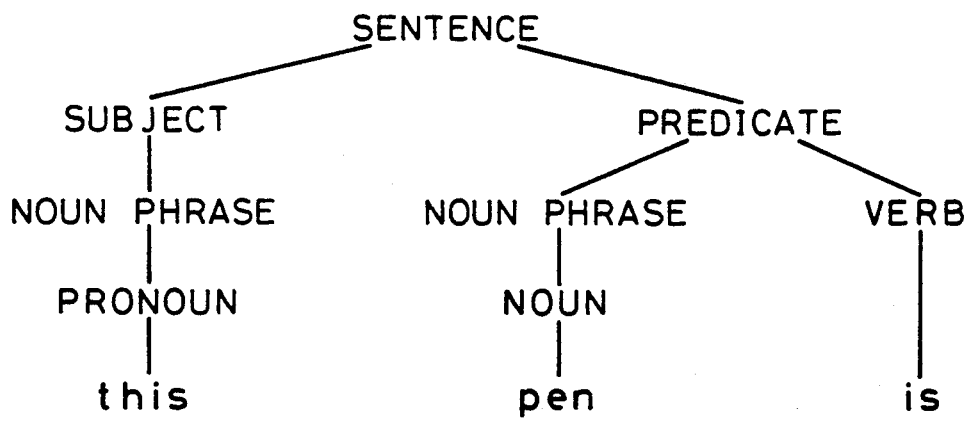
FIG. 9
BUFFER E --- Output Sentence Buffer
This is a Pen.

FIG. 12

| | PART OF SPEECH | NUMBER OF WORDS | FLAGS INDICATING REGISTRATION IN DICTIONARY |
|---|---|---|---|
| Organization | NOUN | 1 | 1 |
| of | PREPOSITION | 1 | 1 |
| Petroleum | NOUN | 1 | 1 |
| Exporting | VERB | 1 | 1 |
| Countries | NOUN | 1 | 1 |
| (OPEC) | NOUN | 1 | 0 |

FIG. 13

| | PART OF SPEECH | NUMBER OF WORDS | FLAGS INDICATING REGISTRATION IN DICTIONARY |
|---|---|---|---|
| Organization | PROPER NOUN | 5 | 1 |
| of | NONE | 0 | 1 |
| Petroleum | NONE | 0 | 1 |
| Exporting | NONE | 0 | 1 |
| Countries | NONE | 0 | 1 |

FIG. 14

| | PART OF SPEECH | NUMBER OF WORDS | FLAGS INDICATING REGISTRATION IN DICTIONARY |
|---|---|---|---|
| Organization | PROPER NOUN | 5 | 0 |
| | NOUN | 1 | 1 |
| of | PREPOSITION | 1 | 1 |
| Petroleum | NOUN | 1 | 1 |
| Exporting | VERB | 1 | 1 |
| Countries | NOUN | 1 | 1 |
| (OPEC) | NOUN | 1 | 0 |

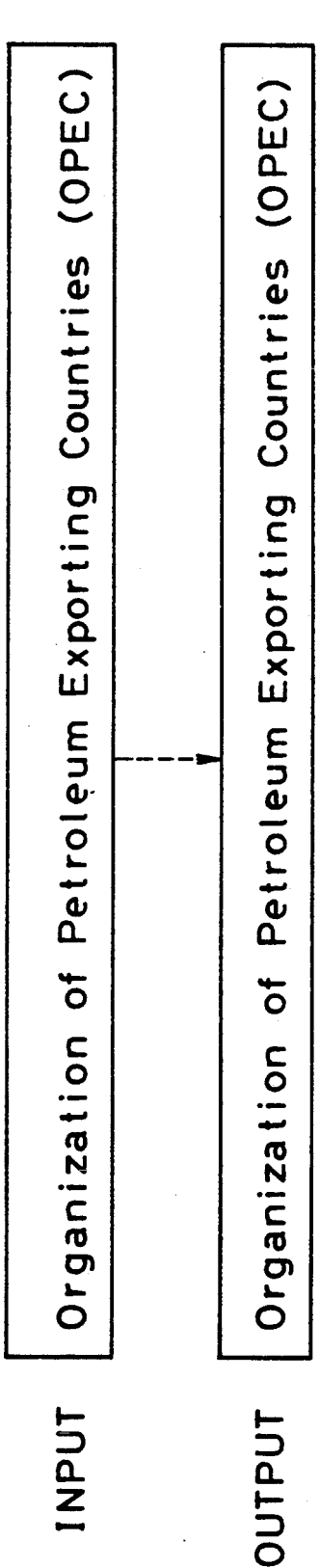
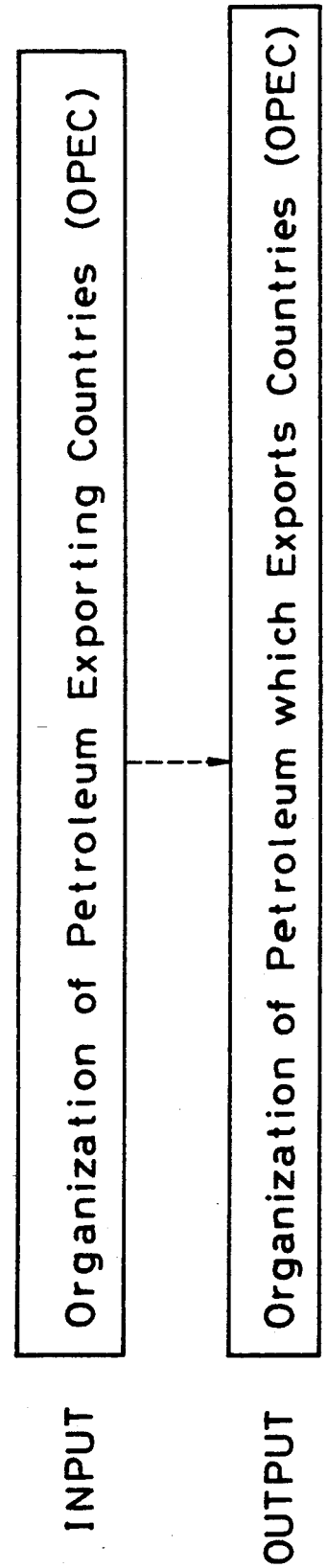
FIG. 15
FIG. 16 PRIOR ART

MACHINE TRANSLATION APPARATUS HAVING A PROCESS FUNCTION FOR PROPER NOUNS WITH ACRONYMS

BACKGROUND OF THE INVENTION

1. Field of the Invention

The present invention relates to a machine translation apparatus, and more particularly to a machine translation apparatus suitable for processing compound-word proper nouns with acronyms.

2. Description of the Prior Art

In a conventional machine translation apparatus, when a word in a sentence entered into the apparatus is used as a proper noun, and if the word is registered as a proper noun in a conversation dictionary which is consulted, a corresponding translated word is generated according to information obtained by consulting the dictionary. On the contrary, if the word is not registered as a proper noun in the dictionary, a translated word is generated based upon information, other than that for proper nouns, obtained from consulting the dictionary.

As mentioned above, despite the fact that a word in a sentence entered into the apparatus is used as a proper noun, if the word is not registered as a proper noun in a conversation dictionary, a translated word is generated based upon other information obtained by consulting the dictionary, thus resulting in incorrect translation.

The above incorrect translation often occurs, particularly in the case in which a plurality of words make up compound-word proper nouns. FIG. 16 illustrates an example of an input sentence and the corresponding output sentence which is incorrectly translated by the conventional machine translation apparatus.

When there is a proper noun, such as "Organization of Petroleum Exporting Countries (OPEC)" in an entered sentence, and if a group of these words is not registered as a compound-word proper noun in the dictionary, a group of these translated words is generated based upon other information obtained from consulting the dictionary. As a result, the proper noun is incorrectly translated as "Organization of Petroleum which Exports Countries," giving an incorrect meaning to the translated text.

Japanese Patent Unexamined Publication No. 63-182775 discloses "a machine translation apparatus" which is constructed such that when a source sentence or a source text including proper nouns is machine-translated, information regarding proper nouns which relate to a preliminary knowledge of the source sentence or the source text, and yet which do not appear in the source sentence or the source text, is generated as part of a translated sentence or a translated text.

SUMMARY OF THE INVENTION

The present invention provides a machine translation apparatus having a process function for proper nouns with acronyms so as to prevent compound-word proper nouns from being incorrectly translated, the apparatus comprising input means for inputting a sentence in a source language; dictionary means for storing dictionary information in order to translate a source language into a target language; display means for displaying the source language and the target language which has been translated; source language analysis means for obtaining the morphology element string of the entered sentence on the basis of information obtained by consulting the dictionary of said dictionary means, for an individual word in a sentence entered by said input means; sentence construction analysis means for analyzing, by using the information obtained by consulting the dictionary, the sentence construction of the morphology element string which is obtained by the source language analysis means; converting means for converting, based upon the information obtained by consulting the dictionary, a sentence construction obtained by the sentence construction analysis means into a structure of a sentence construction in the target language; translation text generating means for translating, based upon the structure of the sentence construction in the target language which is obtained by the converting means and based upon the information obtained by consulting the dictionary, the individual word into a sentence in the target language; determining means for determining, as a result of consulting the dictionary in the source language analysis means, whether or not the word is a proper noun with an acronym; examining means for examining, when the proper noun with an acronym is determined as a proper noun, whether or not there exist words whose number of the capital letters corresponds to the number of the letter of the acronym, on the beginning or end side of the acronym, and for examining whether or not these words are registered as compound words in the dictionary means; and acronym processing means for translating the compound words into a sentence in the target language when the compound words are registered as compound words in the dictionary means, and for directly outputting the words, whose number of the capital letters corresponds to that of letters of the acronym, onto the display means without being translated when the compound words are not registered in the dictionary.

According to the present invention, during translation from a source language to a target language, it is determined whether or not a proper noun with an acronym exists in the source language. When it is determined that an acronym exits, it is then examined whether or not a group of words, whose number of the capital letters corresponds to the number of the letters of the acronym, exist at the beginning or the end of the acronym, and it is also examined whether or not the words are registered as compound words in the conversation dictionary. When the compound words are registered in the conversation dictionary, they are output after being generated in a translated text, and when they are not registered in the paired translation dictionary, the words, whose number of the capital letters corresponds to the number of the letters of the acronym, are directly output in the source language without being translated. Therefore, according to the present invention, since proper nouns made up of compound words with acronyms which are not registered in a dictionary are directly output in a source language without corresponding translations being generated, it is possible to prevent compound-word proper nouns from being output as incorrect translations, thereby generating translated texts easy to understand.

Other features will become apparent from the following Description of the Preferred Embodiments when read with reference to the accompanying drawings.

DESCRIPTION OF THE DRAWINGS

FIGS. 5 through 9 are views illustrating examples of the contents of the memory for each buffer shown in FIG. 4;

FIGS. 12 through 14 are views illustrating the contents of the memory for a buffer B in steps for the consulting dictionary process;

FIG. 15 is a view showing an example of an input sentence and the corresponding output sentence translated by a machine translation apparatus to which the present invention is applied; and FIG. 16 is a view showing an example of an input sentence and the corresponding output sentence translated by a conventional machine translation apparatus.

DESCRIPTION OF THE PREFERRED EMBODIMENTS

Figure 1:
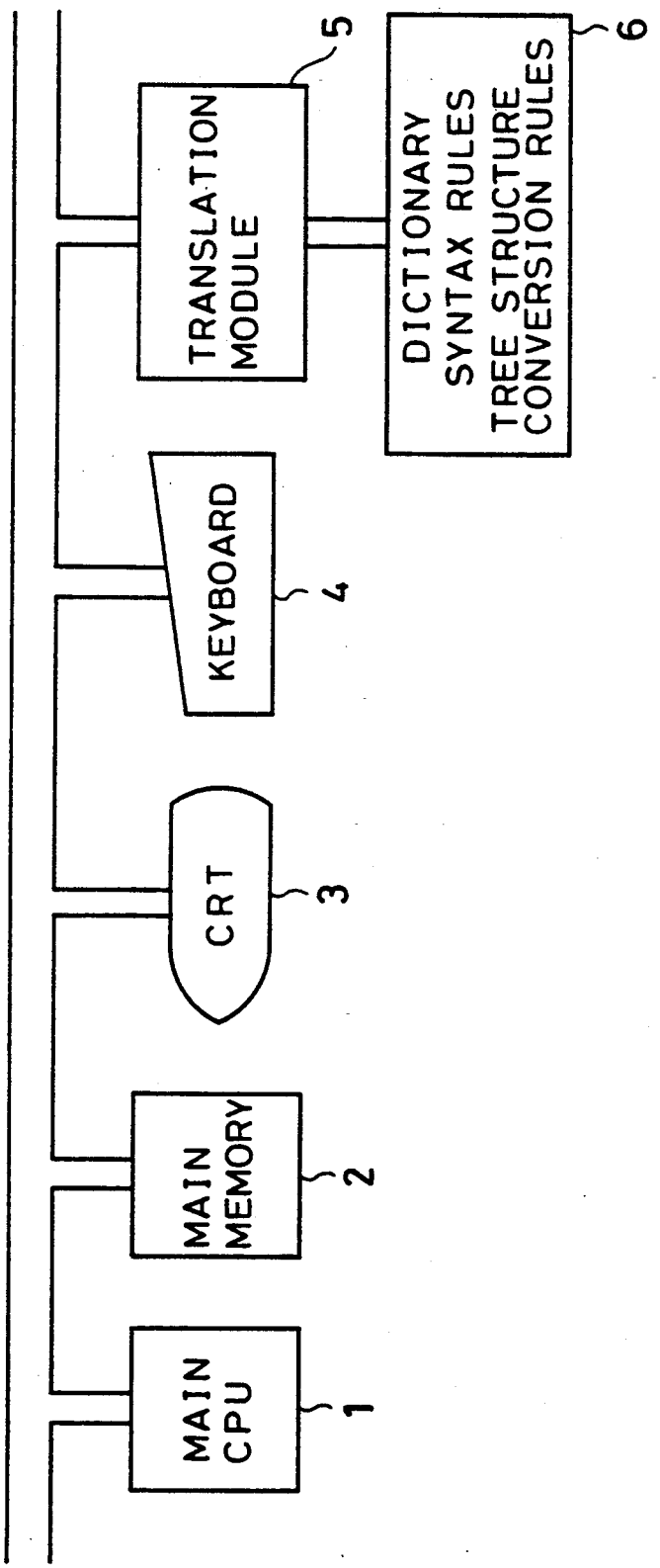
FIG. 1 is a block diagram illustrating an embodiment of a machine translation apparatus to which the present invention is applied.

In FIG. 1, numeral 1 indicates a main CPU (central processing unit), 2 indicates a main memory, 3 indicates a CRT (cathode-ray tube), 4 denotes a keyboard, 5 denotes a translation module, 6 denotes a memory which stores a conversation dictionary for translation (hereinafter referred to simply as a dictionary), syntax rules, tree structure conversion rules, etc.

When a source language is entered, the translation module 5 translates the source language and outputs a corresponding target language. That is, the source language entered by using the keyboard 4 is transferred to the translation module 5 under the control of the main CPU 1. The translation module 5 translates, in a manner which will be described later, the entered source language into a target language by using the dictionary, the syntax rules, the tree structure conversion rules and the like stored in the memory 6. The translated result is temporarily stored in the main memory 2 and is displayed on the CRT 3 at the same time.

Figure 2:
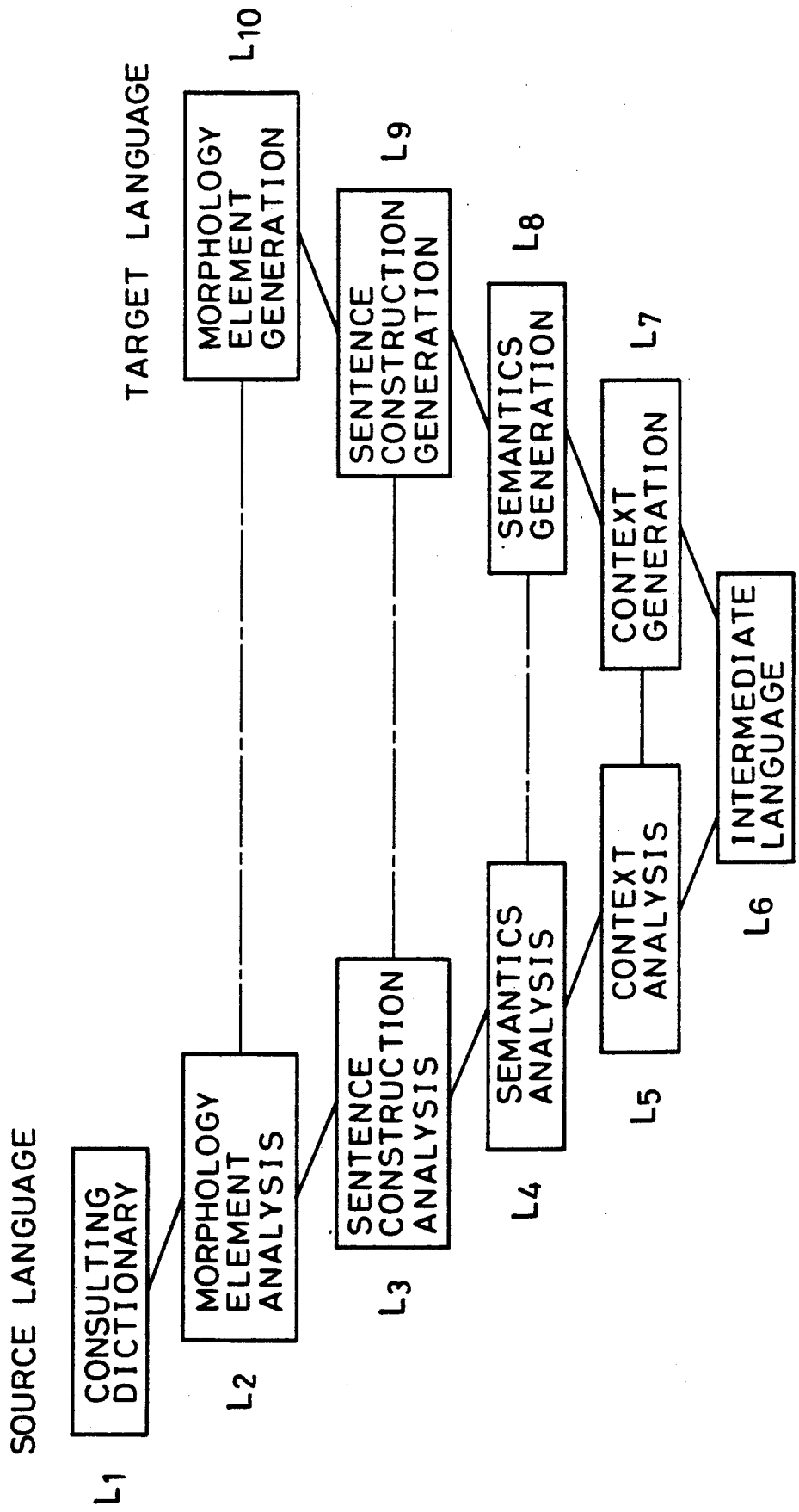
FIG. 2 is a view explaining translation levels in automatic translation.

The machine translation performed by the translation module 5 generally involves analysis levels as shown in FIG. 2. As shown in the upper left side of FIG. 2, once a source language is entered, analysis advances from a consulting dictionary level L1 to a morphology element analysis level L2, a sentence construction analysis level L3, and so on.

The machine translation is largely divided into the following two systems, depending upon the analysis levels. One is a pivot system in which analysis advances up to a concept level L6 (referred to as an intermediate language) which depends neither on a source language nor on a target language, and from there, generation, such as a context generation level L7, a semantics generation level L8, a sentence construction generation level L9 and a morphology element generation level L10, advances in order to generate a target language The other system is a transfer system in which analysis advances to any of the following levels, the morphology element analysis level L2, the sentence construction analysis level L3, the semantics analysis level L4 or the context analysis level L5 in order to obtain the internal structure of a source language. The obtained internal structure of the source language is then converted into the internal structure of a target language whose levels are equal to those of the source language, whereby the target language is generated.

The above-mentioned analyses will now be explained.

Consulting dictionary, morphology element analysis

In this analysis the dictionary in the memory 6 shown in FIG. 1 is consulted to divide an entered sentence into each morphology element string (word string), so that grammatical information such as a part of speech, and an equivalent translated term with respect to each word are obtained. Further, tense, person, number, etc are analyzed.

Sentence construction analysis

In this analysis, a sentence construction (construction analysis tree) such as modifying relationships between words is determined as will be described later.

Semantics analysis

In this analysis, a semantically correct sentence construction from a semantically incorrect sentence construction is distinguished based upon the results of a plurality of the sentence construction analyses.

Context analysis

In this analysis topics are understood and omissions or ambiguities are eliminated.

The translation module 5 utilized in the present invention analyzes at least up to sentence construction analysis level L3. That is, the translation module 5 in the present invention is the one which comprises the sections shown in FIG. 3.

Figure 3:
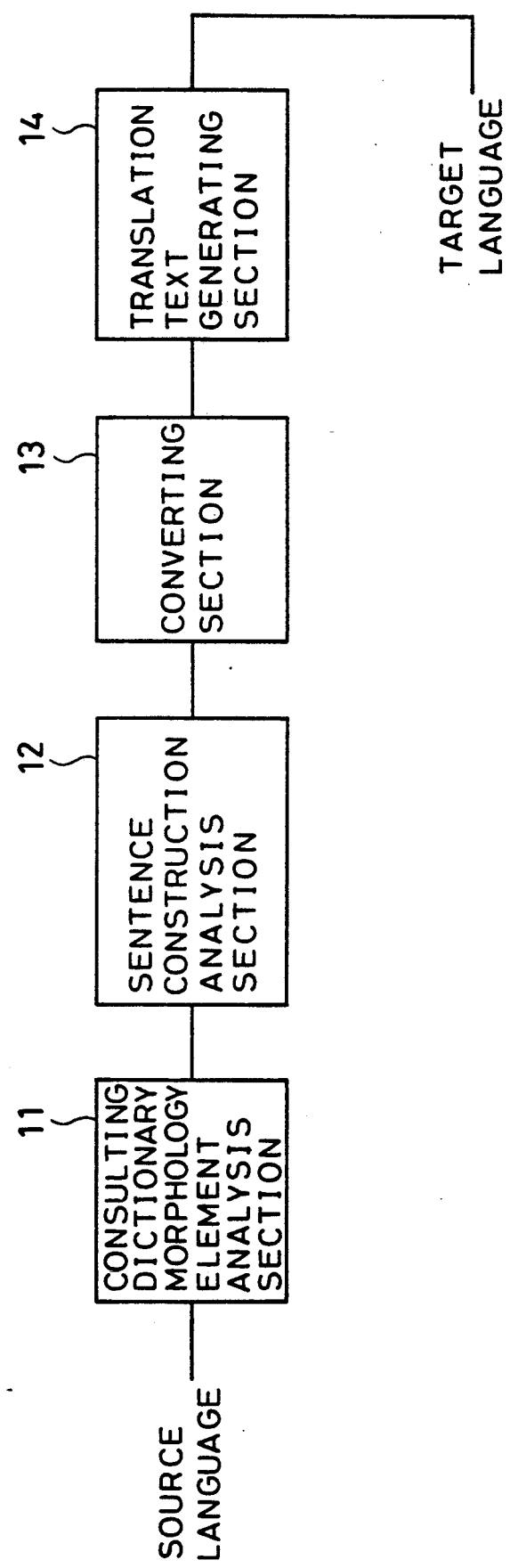
FIG. 3 is a schematic illustration of a translation module.
Figure 4:
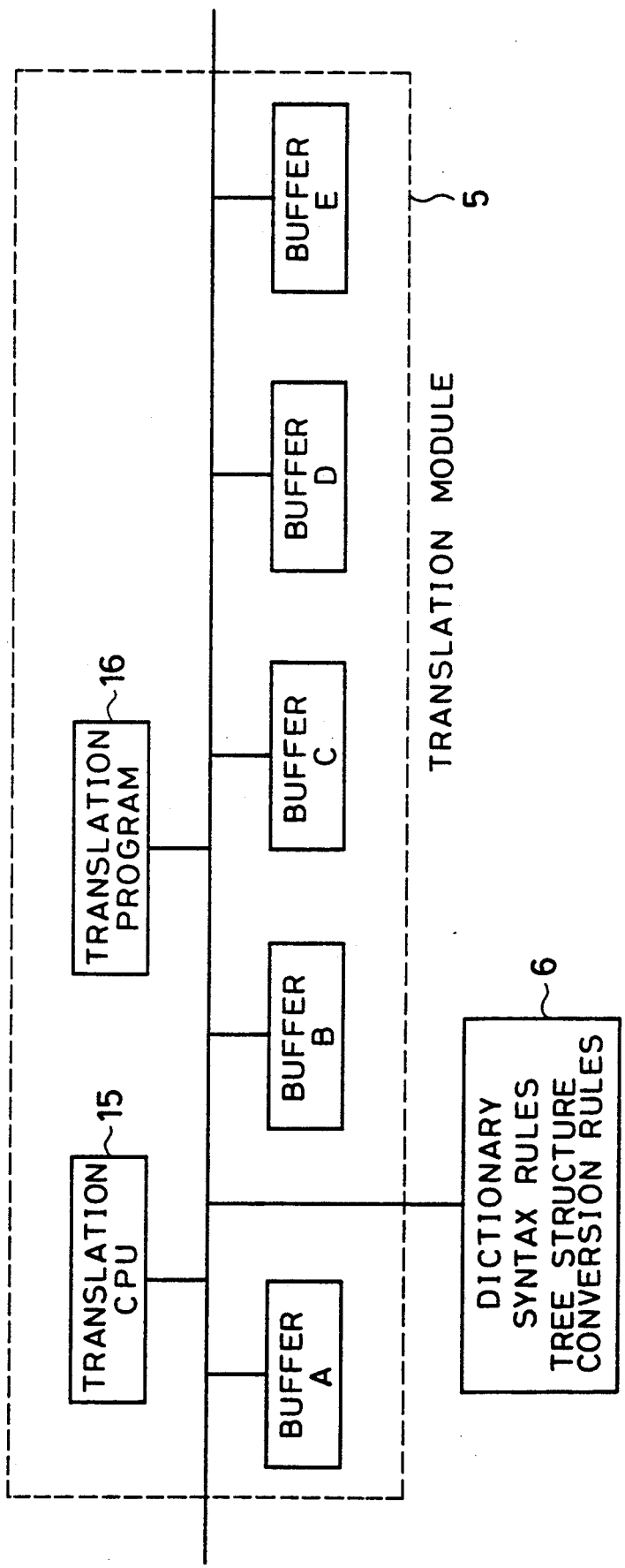
FIG. 4 is a block diagram showing the translation module.

FIG. 4 is a block diagram illustrating the above translation module 5. FIGS. 5 through 9 are views illustrating examples of the contents of buffers A through E shown in FIG. 4, when an English sentence, such as "This is a pen." is translated into Japanese The English-Japanese translation operation will be hereinafter described with reference to FIGS. 3 through 9. First, a source sentence read by the apparatus is stored as shown in FIG. 5 in the buffer A of FIG. 4. Under the control of a translation CPU 15 which is based upon a translation program 16, information required for each word of the sentence is obtained by a consulting dictionary morphology element analysis section 11 in FIG. 3 and by using the dictionary in the memory 6 in accordance with the source sentence stored in the buffer A, and this information is stored in a buffer B in FIG. 4. Although the part of speech which the word "this" has can vary, the part of speech which pertains to the "this" in the sentence "This is a pen." is uniquely determined by a sentence construction analysis section 12 connected to the consulting dictionary morphology element analysis section 11. In the sentence construction analysis section 12, a construction analysis tree showing modifying relationships between words is determined as shown in FIG. 7 according to the dictionary and the syntax rules in the memory 6, and is stored in a buffer C shown in FIG. 4. The construction analysis tree is determined in the following manner, that is, according to the following rules:

1. sentence→the subject and the predicate
2. the subject→noun phrase
3. the predicate→verb and noun phrase
4. noun phrase→pronoun
5. noun phrase→article and noun The above rules are obtained from the syntax rules in the memory 6. For example, the first rule indicates that "A sentence consists of the subject and the predicate." The construction analysis tree is hereinafter determined according to these rules.

In a converting section 13 of FIG. 3, in the same manner as in the above-mentioned sentence construction analysis section 12, the structure of the construction analysis tree (see FIG. 7) for the entered English sentence is converted, by using the tree structure conversion rules in the memory 6, into the structure of the corresponding Japanese sentence construction, as shown in FIG. 8. The obtained result is then stored in a buffer D in FIG. 4. In a translation text generating section 14 of FIG. 3, an appropriate joshi or particle "wa" and an auxiliary verb are added to the obtained Japanese character string "This pen is.", so that the string is converted into the Japanese sentence shown in FIG. 9, and is stored in a buffer E of FIG. 4. The Japanese sentence "This is a pen." is not only output from the translation module 5 but is also stored in the main memory 2, and is displayed as well on the CRT 3 at the same time.

The description hitherto given has pertained to the English-Japanese translation operation in a general case. The features of the present invention will now be described.

Figure 10A:
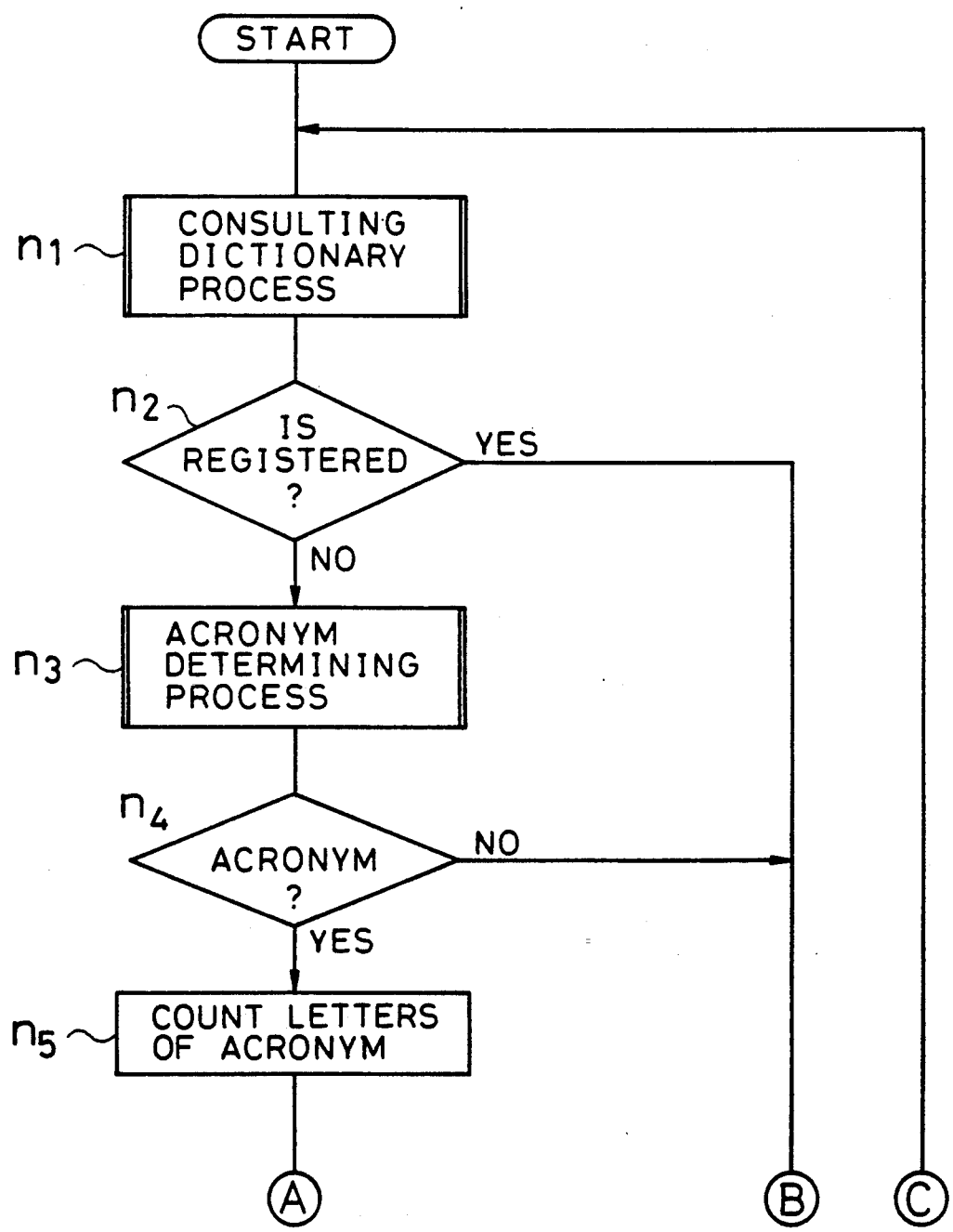
FIGS. 10A to 10B are flow charts showing the operation of a consulting dictionary process according to an embodiment.
Figure 10:
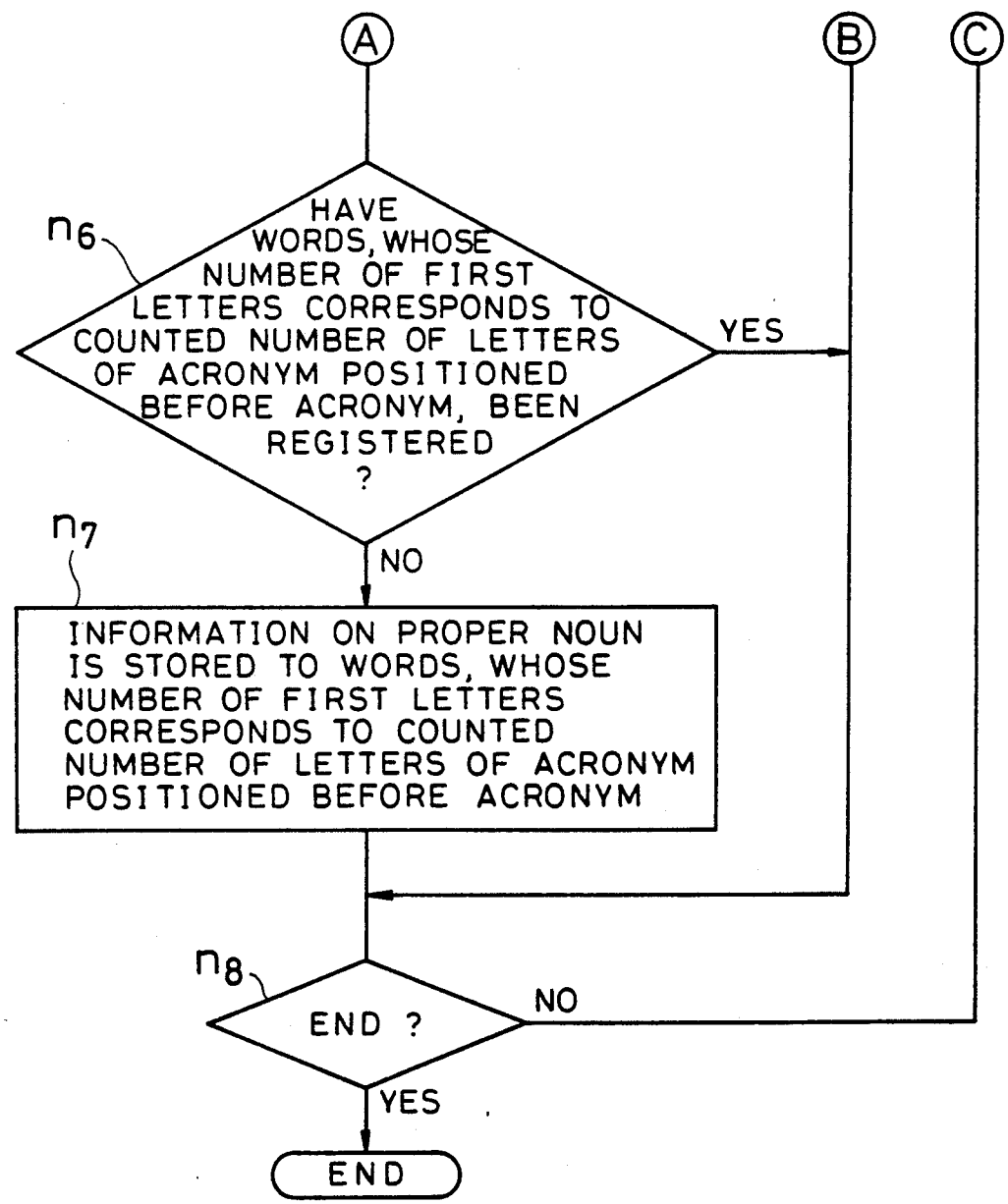

First, the operation of the consulting dictionary process in the consulting dictionary morphology element analysis section 11 according to the present invention will be hereinafter explained with reference to the flow chart shown in FIG. 10. For the explanation, reference should be made to the proper noun with an acronym "Organization of Petroleum Exporting Countries (OPEC)" illustrated in FIG. 15.

The logical sequence needed for the consulting dictionary starts in step n1, in which the consulting dictionary process for words in a sentence entered into the apparatus is performed, and when a word is registered in the dictionary, the information obtained by consulting the dictionary is retained in the buffer B so as to correspond to the word. FIG. 12 illustrates the contents of the memory retained in the buffer B at the completion of the process in step n1, i.e., at the completion of the consulting dictionary process for, e.g., the word "(OPEC)." The logical sequence then proceeds to step n2, in which it is determined whether or not the word has been registered in the dictionary. The determination is made by examining whether or not the buffer B is flagged to indicate the registration (whether or not the buffer B contains "1"). If the word has been registered in the dictionary, the logical sequence proceeds to step n8, while on the contrary, if the word has not yet been registered in the dictionary, the logical sequence proceeds to step n3 in order to perform an acronym determining process which will be described later. FIG. 13 illustrates the contents of the memory retained in the buffer B if the word "Organization of Petroleum Exporting Countries" has been registered in the dictionary. After the completion of the acronym determining process, the logical sequence proceeds to step n4, in which it is determined, based upon the result of the acronym determining process, whether or not the word is an acronym. If the word is an acronym, the logical sequence proceeds to step n5, on the other hand, if the word is not an acronym, the logical sequence proceeds to step n8. In step n5, the number of the letters of the word which has been determined as an acronym is counted (the number of letters of the word OPEC shown in FIG. 15 is four). The logical sequence further proceeds to step n6, in which it is determined whether or not a group of words, whose number of the capital letters corresponds to the number of letters of the acronym, i.e., four, and which is positioned at the beginning of the acronym (OPEC), is registered as a compound-word proper noun in the dictionary. The number of the group of words is counted from the word which is positioned in the place closest to the acronym. If the group of words is registered in the dictionary, information obtained by consulting the dictionary is stored in the buffer B so as to correspond to the group of words. The logical sequence then proceeds to step n8. On the contrary, if the group of words is not registered in the dictionary, the logical sequence proceeds to step n7, in which information, indicating that the above group of words is a proper noun which has not yet been registered, is retained in the buffer B. FIG. 14 illustrates the contents of the memory retained in the buffer B at the completion of step n7. The word "Organization" has two parts of speech: a proper noun (the number of words is five) and a noun (the number of words is one). The logical sequence proceeds to step n8, in which it is determined whether or not the consulting dictionary process for all words in the entered sentence is completed. If the process is completed, the program needed for the consulting dictionary process terminates there, while on the contrary, if the process is not completed, the logical sequence returns to step n1 to proceed with the consulting dictionary process for next words.

Figure 11A:
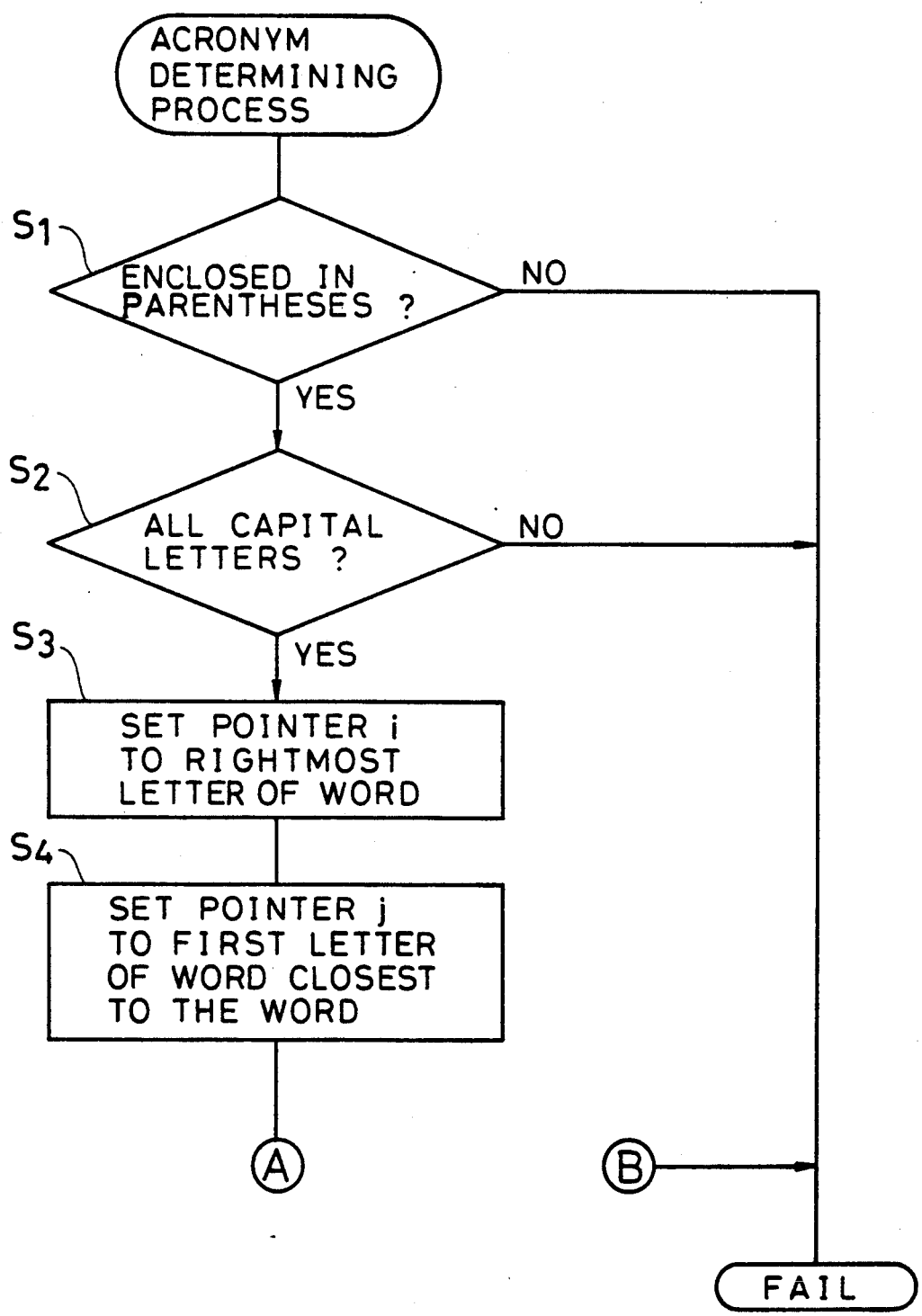
FIGS. 11A to 11B are flow charts showing the operation of an acronym determining process according to the embodiment.
Figure 11B:
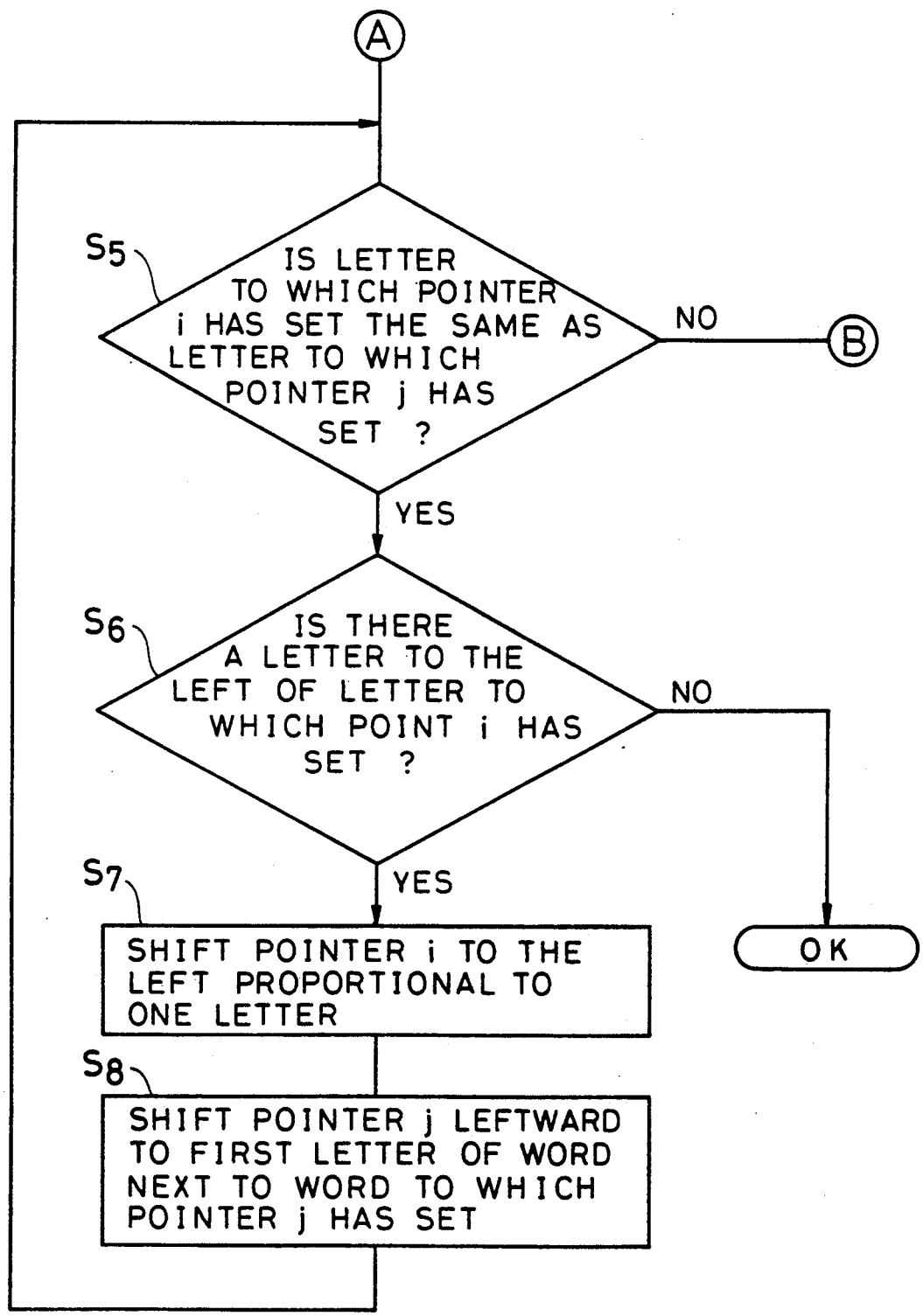

The above-described acronym determining process will now be explained with reference to the flow chart of FIG. 11. The logical sequence needed for the acronym determining process starts in step s1, in which it is determined whether or not an entered word is enclosed in parentheses, and then proceeds to step s2, in which it is determined whether or not all letters of the word are capital. If the entered word satisfies both of the above conditions required for the acronym determining, the logical sequence proceeds to step s3, while on the contrary, if the entered word satisfies only one of the above conditions, or satisfies neither of the above conditions, it is determined that the entered word is not an acronym.

Further, in step s3 it is determined whether or not "each letter of an acronym corresponds to each of the first letters of a group of words, whose number of the capital letters corresponds to the number of letters of the acronym, and which exists at the beginning of the acronym." More specifically, in the example of FIG. 15, in order to compare "C in OPEC" with "C in Countries," "E in OPEC" with "E in Exporting," "P in OPEC" with "P in Petroleum," and "0 in OPEC" with "0 in Organization," a pointer i is set to the rightmost letter of the word OPEC which has been determined as a candidate for the acronym. The logical sequence then proceeds to step s4, in which a pointer j is set to the capital letter of the word positioned in the place closest to the word OPEC. The logical sequence proceeds to step s5, in which it is determined whether or not the letter to which the pointer i has been set is identical to the letter to which the pointer j has been set. If the two letters are not identical, it is determined that the word which has been a candidate for the acronym is not an acronym. On the contrary, if the two letters are identical, the logical sequence proceeds to step s6, in which it is determined whether or not there exists a letter to the left of the letter to which the pointer i has been set. If there exists no letter to the left, it is determined that the word is an acronym. If there exists a letter to the left, the logical sequence proceeds to step s7, in which the pointer i is shifted leftward from the position to which the pointer i has been set to a distance proportional to one letter. The logical sequence further proceeds to step s8, in which the pointer j is shifted from the position to which the pointer j has been set to the capital letter of the word positioned to the left of the word to which the pointer j has been set. The logical sequence returns to step s5 in order to proceed with the above described comparison of two letters for next letters. When the pointer j is shifted to a word whose first letter happens to be a lower-case letter ("of" in the example "Organization of Petroleum Exporting Countries (OPEC)" shown in FIG. 15), the pointer j is further shifted to the word positioned to the left of the word with the lower-case letter.

Thus it is determined whether or not each letter of a word is the subject of the acronym determination matches a corresponding capital letter of each word of a group of words which is positioned before the word. If any letters do not correspond to each other, upon finding this mismatch, the word is not regarded as an acronym, while on the contrary, if all the letters correspond to each other, at the completion of matching, the word is regarded as an acronym.

Further, the translation text generating section 14 outputs directly the above-mentioned word without generating the corresponding translated word, if information regarding the proper noun which has not yet been registered is added during the process of generating and outputting the translated sentence based upon information which is obtained by consulting the dictionary stored in the buffer B.

FIG. 15 is a view showing an example of an input sentence and the corresponding output sentence translated by a machine translation apparatus to which the present invention is applied. If information regarding the proper noun which has not yet been registered is added with respect to each word of a group of words whose capital letters from an acronym, such as "Organization of Petroleum Exporting Countries (OPEC)", the above words are output in the original form without being translated.

As has been described, according to the present invention, when there is a word which is an acronym in a sentence entered into the apparatus, it is determined whether or not the group of words, which is positioned before the word which is the acronym, and whose number of the capital letters corresponds to the number of letters of the word with the acronym, is registered as a compound-word pronoun in the dictionary. If the group of words is not registered, it is directly output without being translated during the generation of translation.

The invention has been described in detail with particular reference to the preferred embodiments thereof, but it will be understood that variations and modifications of the invention can be made within the spirit and scope of the invention.

What is claimed is:

1. A machine translation apparatus having a process function for translating proper nouns used as acronyms, comprising:
   input means for entering a sentence in a source language;
   dictionary means for storing dictionary information for translating a source language into a target language;
   display means for displaying the source language and the target language which has been translated;
   source language analysis means for obtaining, on the basis of information obtained by consulting the dictionary information of said dictionary means, a morphology element string for the individual words in the sentence entered in the source language by said input means;
   sentence construction analysis means for analyzing, by using said dictionary information obtained by consulting the dictionary, the sentence construction of the morphology element string which is obtained by said source language analysis means;
   converting means for converting, based on said dictionary information obtained by consulting the dictionary, a sentence construction obtained by said sentence construction analysis means into a sentence construction in the target language;
   translation text generating means for translating, based upon the structure of the sentence construction in the target language which is obtrained by said converting means and based upon said dictionary information obtained by consulting the dictionary, the individual words of a sentence entered in the source language into a sentence in the target language;
   determining means for determining, as a result of consulting the dictionary by said source language analysis means, whether or not an individual word in said source language sentence is a proper noun used as an acronym;
   examining means for examining, when said word is determined to be a proper noun used as an acronym, whether or not said target language sentence contains a selected group of words having a number of capital letters which corresponds to the number of letters in the acronym, said selected group of words being positioned on one side of the acronym, and for examining whether or not the selected group of words are registered as compound words in said dictionary means; and
   acronym processing means for translating the selected groups of words into a sentence in the target language when the selected group of words are registered as compound words in said dictionary means, and for directly outputting the words, whose number of capital letters corresponds to the number of letters in the acronym, onto said display means without being translated when the selected group of words are not registered as compound words in the dictionary.

2. A machine translation apparatus according to claim 1, wherein said dictionary information includes a dictionary, syntax rules and sentence construction conversion rules.

3. A machine translation apparatus according to claim 1, wherein said determining means examines a first condition specifying that the individual word be enclosed in parentheses and a second condition specifying that the individual word be made up solely of capital letters, and determines whether or not both said first and second conditions are satisfied.

4. A machine translation apparatus according to claim 1, wherein said examining means compares the rightmost letter of the acronym with a capital letter which is the first letter of a word which is positioned in said selected group of words in the place closest to the acronym in order to determine whether or not these two letters which are compared are the same, and further compares each of the rest of the letters of the acronym with each corresponding capital letter which is the first letter of each subsequent word of said selected group of words which are positioned in a direction moving away from the acronym to determine whether or not each of the rest of the letters of the acronym is the same as each corresponding capital letter of each subsequent word of the selected group of words, until the leftmost letter of the acronym is compared with the corresponding capital letter of a word in the selected group of words, which is positioned furthest away from said acronym.

5. A machine translation apparatus according to claim 4, wherein said examining means includes means for skipping a word of said selected group of words when the first letter of said word is a lower-case letter.

* * * * *